J. M. PFAUDLER.
Hose-Coupling Faucet for Beer-Fermenting Vessels.
No. 210,209. Patented Nov. 26, 1878.
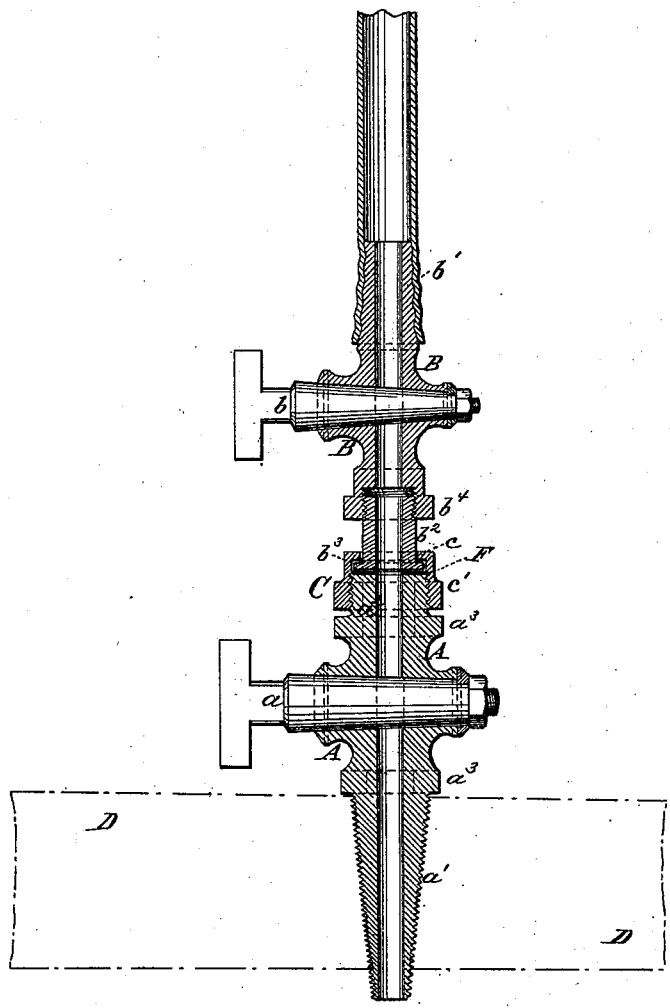
Witnesses:
H. Rydquist
Milton J. Roberts
Inventor:
John M. Pfaudler
per A. W. Almquist
Attorney.

UNITED STATES PATENT OFFICE.

JOHN M. PFAUDLER, OF ROCHESTER, NEW YORK.

IMPROVEMENT IN HOSE-COUPLING FAUCETS FOR BEER-FERMENTING VESSELS.

Specification forming part of Letters Patent No. 210,209, dated November 26, 1878; application filed November 4, 1878.

*To all whom it may concern:*

Be it known that I, JOHN M. PFAUDLER, of Rochester, in the county of Monroe and State of New York, have invented a new and useful Hose-Coupling Faucet for Beer-Fermenting Vessels, of which the following is a specification:

My invention relates especially to the apparatus for fermenting beer described in Letters Patent No. 205,572, issued to me July 2, 1878, its object being to provide a simple device which will enable the attachment and detachment to the same branch hose of one of the section-pipes of several barrels or other fermenting-vessels successively, to be rapidly and conveniently effected without escape of gas while under pressure.

The invention consists in the combination of a stop-cock having a threaded taper shank (for screwing it into a fermenting-vessel) and threaded nipple with another stop-cock having corrugated taper shank, adapted for the attachment of a hose and flanged nipple, and with a threaded and flanged thimble for tightly coupling the said nipples together, as will be hereinafter described and claimed.

The accompanying drawing represents a longitudinal vertical section of my coupling-faucets in position for use.

A and B are two stop-cocks with tapering shanks $a^1$ $b^1$, and turning conical valve-plugs $a$ $b$, arranged at right angles to the passage or pipe. The shank $a^1$ is threaded, so that it may be screwed into a hole through one of the upper staves of a barrel or other fermenting-vessel, D, and thus the cock A may be secured to the said vessel. The shank $b^1$ is grooved or corrugated around its surface, in order that, when inserted in the end of a hose, E, whose other end is connected to one of the pipes of the fermenting apparatus, it will afford a better hold for the cord with which the hose is wound to the shank. The outlet end of the cock A is a threaded nipple, $a^2$. The inlet end of the cock B is a nipple, $b^2$, provided with the surrounding end flange $b^3$.

C is a thimble, threaded on the inside to fit the thread around the nipple $a^2$, and provided with the inward flange $c$, by which latter it surrounds the nipple $b^2$, and rests upon the flange $b^3$, so that it can be turned upon but not detached from the nipple $b^2$, and when screwed down upon the nipple $a^2$ will tighten the flange $b^3$ upon the end of the nipple $a^2$, a packing-ring, F, being interposed, and thus secure the two cocks A and B together in a manner which will prevent leakage, while allowing of a free flow of gas from the vessel D to the hose E when the valves $a$ $b$ are open, as in the drawing.

To prevent the escape of gas while replacing the vessel D by another provided with a similar cock, A, it is only necessary to close the valves $a$ $b$ before unscrewing the thimble C. Upon the castings A B C are formed polygonal flat surfaces $a^3$ $b^4$ $c'$, to afford hold for wrenches in connecting them.

Having thus described my invention, I do not claim separately either the stop-cocks, whether with threaded or corrugated taper shanks, or the ordinary thimble-coupling C $a^2$ $b^2$; but

What I claim as new, and desire to secure by Letters Patent, is—

The combination of the stop-cock A, having threaded taper shank $a^1$, and the threaded nipple $a^2$ with the stop-cock B, having corrugated taper shank $b^1$ and the flanged nipple $b^2$, and with the threaded and flanged thimble C, substantially as and for the purpose set forth.

JOHN M. PFAUDLER.

Witnesses:
H. RYDQUIST,
A. W. ALMQVIST.